(12) United States Patent
Sanders

(10) Patent No.: US 11,233,646 B2
(45) Date of Patent: Jan. 25, 2022

(54) SEARCHABLE ENCRYPTION METHOD

(71) Applicant: Orange, Paris (FR)

(72) Inventor: Olivier Sanders, Châtillon (FR)

(73) Assignee: ORANGE, Paris (FR)

( * ) Notice: Subject to any disclaimer, the term of this patent is extended or adjusted under 35 U.S.C. 154(b) by 80 days.

(21) Appl. No.: 16/464,227

(22) PCT Filed: Nov. 15, 2017

(86) PCT No.: PCT/FR2017/053120
§ 371 (c)(1),
(2) Date: May 24, 2019

(87) PCT Pub. No.: WO2018/096237
PCT Pub. Date: May 31, 2018

(65) Prior Publication Data
US 2019/0394038 A1 Dec. 26, 2019

(30) Foreign Application Priority Data
Nov. 28, 2016 (FR) ...................................... 1661597

(51) Int. Cl.
*H04L 9/30* (2006.01)
*G09C 1/00* (2006.01)
(Continued)

(52) U.S. Cl.
CPC .............. *H04L 9/3093* (2013.01); *G09C 1/00* (2013.01); *H04L 9/00* (2013.01); *H04L 9/008* (2013.01);
(Continued)

(58) Field of Classification Search
CPC ......... H04L 9/3093; H04L 9/00; H04L 9/008; H04L 9/08; H04L 9/0816; H04L 9/30;
(Continued)

(56) References Cited

U.S. PATENT DOCUMENTS

2014/0188626 A1* 7/2014 Biswas .............. G06Q 30/0269
705/14.66

OTHER PUBLICATIONS

Fang et al: "A Secure Channel Free Public Key Encryption with Keyword Search Scheme without Random Oracle," Dec. 12, 2009, Cryptology and Network Security, Springer Berlin Heidelberg, pp. 248-258.

(Continued)

*Primary Examiner* — Jung W Kim
*Assistant Examiner* — Howard H. Louie
(74) *Attorney, Agent, or Firm* — Knobbe, Martens, Olson & Bear, LLP

(57) ABSTRACT

A method for searchable encryption of a system defining a secret key and a public is provided. A data stream cipher can include n elementary data $(b_1, b_2, \ldots, b_n)$. The method can include generation of a variate for all elementary data $b_j$, for values of j from 1 to n, generation of an element function of the public key $(g^{x(bj) \cdot zj})$ and the variate, the element being associated with a random element of a group of a bilinear environment, the element associated with the random element of the group forming first encryption data $(C_{j,1})$. The method can also include generation of a shift factor $(g^{\alpha \cdot zj^{-1}})$ function of the variate and the public key, and associated with the random element of the group, the shift factor representing a position of the monomial in the encrypted stream, the shift factor associated with the random element of the group forming second encryption data. The data stream cipher can include the first and second encryption data for all values of j from 1 to n.

17 Claims, 2 Drawing Sheets

(51) Int. Cl.
*H04L 9/00* (2006.01)
*H04L 9/08* (2006.01)

(52) U.S. Cl.
CPC .............. *H04L 9/08* (2013.01); *H04L 9/0816* (2013.01); *H04L 9/30* (2013.01); *G06F 2211/007* (2013.01); *G06F 2211/008* (2013.01)

(58) Field of Classification Search
CPC ................ G09C 1/00; G06F 2211/007; G06F 2211/008
See application file for complete search history.

(56) References Cited

OTHER PUBLICATIONS

Wang et al: "Secure Channel Free ID-Based Searchable Encryption for Peer-to-Peer Group," Journal of Computer Science and Technology, Science Press, Sep. 9, 2016, vol. 31, No. 5, pp. 1012-1027.
International Search Report and Written Opinion dated Mar. 19, 2018 for Application No. PCT/FR2017/053120.
Wang et al: "Inverted index based multi-keyword public-key searchable encryption with strong privacy guarantee," 2015 IEEE Conference on Computer Communications (INFOCOM), Apr. 1, 2015, pp. 2092-2100.

* cited by examiner

SEARCHABLE ENCRYPTION METHOD

RELATED APPLICATIONS

This application is the U.S. National Phase of Application No. PCT/FR2017/053120 entitled "SEARCHABLE ENCRYPTION METHOD" and filed Nov. 15, 2017, which claims the benefit of French Patent Application No. 1661597, filed Nov. 28, 2016, each of which is incorporated by reference in its entirety.

The invention pertains to the field of telecommunications.

It relates more particularly to a so-called "searchable" encryption system, that is to say a system making it possible to detect the presence of a certain word in a ciphertext.

Increasingly systematic recourse to data encryption poses genuine problems in a digital world where the processing of data is often entrusted to a third-party entity to which one does not want to grant access to plaintext data. This may be the case for example with a decentralized storage system of cloud computing type which an enterprise may call upon to store the entirety of its archives in an encrypted manner. It may then happen that a user in the enterprise wants to retrieve, from among these archived data, one data item in particular. The manager of the cloud might be incapable of detecting the user's data item among the set of encrypted archives and might therefore be compelled to return the entirety of the encrypted archives to the enterprise. Cryptographic solutions exist for identifying a particular data item in a set of encrypted data and thus avoid repatriating the entirety of the encrypted archives.

The cryptographic solution spotlighted in this case is called "searchable encryption". Searchable encryption makes it possible to detect whether an element is a ciphertext of a keyword, denoted W, on condition that certain information, customarily called a "trapdoor" and associated beforehand with the keyword W, is held. In this case, the data item which comprises the keyword is encrypted in a conventional manner and a searchable encryption is applied to the keyword. Thus, in the example of storage in a cloud, the user who wants to send a data item for archiving in the cloud in a secure manner defines a keyword that he associates with this data item. He then conventionally encrypts his data item and applies a searchable encryption to the associated keyword and then transmits these encrypted elements to the cloud for archiving. He may thereafter request the repatriation of the archived encrypted data item, by specifying the keyword that he had associated with it.

It is also possible to apply this technique for searching for information in encrypted traffic. For example, in the case of an intrusion detection system, it is customary to search for a virus (or "malware") in a data stream by detecting the presence of a certain string of characters, commonly called a "signature", which then constitutes a keyword to be searched for. However, when a data stream is involved, the notion of keyword is difficult to define. Indeed, a data stream, for example an Internet stream, does not actually have a structure: it may contain URLs ("Uniform Resource Locators"), binary code, etc., from which it is difficult to extract keywords. Moreover, involving as it does an encrypted stream sent in a network between two entities: a sender and a receiver, it is difficult to apply searchable encryption directly. Indeed, the sender in charge of defining the keywords does not have a priori knowledge of the information that the receiver is searching for. Thus, the defining of keywords in a stream may turn out to be problematic.

A recently proposed solution uses searchable encryption algorithms to process data streams. This solution, called "BlindBox", consists in splitting the data item, processed as a string of characters, into sub-strings of a certain length l and in making these sub-strings into the keywords of the data item. For example, if l=3 and one considers strings of bytes, the data item "example" is split up into the following sub-strings: "exa", "xam", "amp" and "ple". Each of these sub-strings is then considered to be a keyword and is encrypted using a searchable encryption algorithm. However, this solution makes it possible to search only for words of size l. The keywords to be searched for, for example the signatures in the case of malware, rarely have the same size. It is then necessary to tailor the solution.

A first solution is to reproduce the splitting and the encryption for each possible keyword size. This solution poses obvious efficiency problems: it increases the complexity of the encryption and the volume of the traffic.

A second solution consists in splitting if necessary the keywords to be searched for so as to force them to be of the same size. If for example, it is a question of sending a trapdoor for the word "execute" and the length of the trapdoors is limited to three, then the trapdoors "exe", "cut" and "ute" are associated with the word "execute". The entity which generates these trapdoors wanted the presence of "execute" to be identified in the encrypted stream, but with this split, all the executables, with extension "exe", are detected. Here, the number of keywords is multiplied and the information revealed may be more significant than necessary. Moreover, in view of the number of keywords to be searched for, a risk is that the entity which performs the search has at its disposal a trapdoor for almost all the words of lengths three and that it is thus capable, using each of these trapdoors, to deduce the entirety of the plaintext data item. This solution is therefore detrimental to security.

These examples illustrate the complexity of choosing keywords for the implementation of searchable encryption in the case of a data stream and for the methods which use it.

One of the aims of the invention is to remedy inadequacies/drawbacks of the prior art and/or to afford improvements thereto.

To this end, the invention proposes a method for generating trapdoors in a searchable encryption system, said system defining a secret key and a public key, a trapdoor V being associated with a keyword W comprising l elementary data $w_1 \ldots w_l$, said trapdoor being generated by:
  generation of l randoms $v_1, v_2, \ldots, v_l$,
  generation of a polynomial V in an element z, dependent on the secret key, and of degree l, a j-th coefficient of said polynomial, $1 \leq j \leq l$, being dependent on an encoding of the j-th elementary data item $W_1$ of the keyword defined in the secret key and a j-th random $v_j$ of the l-randoms, said trapdoor comprising said polynomial associated with a random element of a group h of a bilinear environment, and the l randoms associated with the random element of the group.

The searchable encryption method, and especially the method for generating trapdoors, makes it possible to perform the search for a keyword of any length in this string. Thus an entity which performs the search for a keyword associated with the trapdoor generated obtains not only the information that a stream contains the keyword as sub-string but also the precise position of this keyword in the stream. Moreover, the size of the trapdoor associated with the keyword is independent of the size of the stream to be encrypted and the method does not impose any constraint as regards their size and their number.

The invention also relates to a searchable encryption method of a system defining a secret key and a public key, a ciphertext C of a data stream B which comprises n elementary data $b_1, b_2, \ldots, b_n$ comprising:

generation of a random a, for any elementary data item $b_j$, j=1 to n, generation of an element dependent on the public key $g^{x(b_j) \cdot z^j}$ and the random, said element being associated with a random element of a group g of a bilinear environment, said element associated with the random element of the group forming a first encryption data item $C_{j,1}$, and generation of a shift factor $g^{a \cdot z^{j-1}}$ dependent on the random and the public key, and associated with the random element of the group, said shift factor being representative of a position of said monomial in the encrypted stream C, said shift factor associated with the random element of the group forming a second encryption data item $C_{j,2}$, said ciphertext C of the data stream comprising for any j=1 to n, the first and second encryption data items.

The searchable encryption method described here is performed by producing a ciphertext of the stream, independently of the keywords to be searched for. The searchable encryption method circumvents the necessity to define keywords for a data item to be encrypted. Thus, the entity which encrypts the stream and which sends it does not have to worry about defining the keywords during encryption, or about the size of these keywords as is currently the case in the known solutions. The absence of such constraints makes it possible to envisage applications of searchable encryption to services for which searchable encryption imposed heavy constraints hitherto.

A first exemplary application relates to malware detection for an enterprise, implemented by a third-party entity. The enterprise which receives its streams encrypted generates the trapdoors associated with malware signatures provided by the third-party entity which is thereafter capable of detecting these signatures in the encrypted stream.

A second exemplary application is a parental control service. In the case of an encrypted broadcast of contents from a sender to a plurality of receivers, each of the receivers can specify its own keywords to an entity designed to detect them in the stream. Thus, the keywords that an individual who receives encrypted Internet streams wants to filter are defined by said individual himself.

The invention also pertains to a method for detecting a keyword W in an encrypt C of a data stream B in a searchable encryption system, said system defining a secret key and a public key, said keyword comprising l elementary data $w_1 \ldots w_l$, the method comprising:

obtaining of a trapdoor T associated with the keyword, said trapdoor comprising l randoms $h^{v_i}$ associated with a random element h of a group of a bilinear environment, and a polynomial V in an element z, dependent on the secret key and of degree l, said polynomial being associated with the random element of the group $h^V$, an i-th coefficient of said polynomial, $1 \leq i \leq l$, being dependent on an encoding of the i-th elementary data item $w_i$ of the keyword defined in the secret key and an i-th random $v_i$ of the l randoms, starting from a current position j, and for any i=1 to l, coupling of the (j+i)-th element of the ciphertext and of the i-th random of the trapdoor by means of a bilinear mapping e, said bilinear mapping taking as input a first element g of a first group G1 and a second element h of a second group G2 and with values in a third group GT, and assembling the l couplings obtained, said assembling producing a first polynomial of degree l, for any i=1 to l, coupling of the shift factor associated with the current position and of the polynomial V associated with the trapdoor, said coupling producing a second polynomial U of degree l, comparison of the first and second polynomials, equality of the two polynomials being representative of the presence of the keyword W in the stream starting from the current position j.

The detection of a keyword, which consists in reconstructing a polynomial on the basis of successive elementary data of the encrypted stream and in comparing it with a polynomial corresponding to a trapdoor associated with the keyword is performed anywhere in the stream.

The entity which implements the method for detecting a keyword has no information as regards the plaintext stream except for the possible presence of the keyword. These trapdoors are generated by an entity holding the secret key which provides them to the detection entity. Thus, security is guaranteed insofar as the entity which detects the presence of keywords can be completely independent of the entity which holds the secret key of the encryption system. Indeed, the trapdoors associated with the keywords to be identified in the stream are created by the entity holding the secret key and transmitted to the entity in charge of intercepting/identifying the keyword in the encrypted stream.

The invention also relates to a method for decrypting a ciphertext C of a data stream B, said data stream comprising n elementary data $b_1, b_2, \ldots, b_n$, the ciphertext being generated in accordance with the searchable encryption method as claimed in claim 2, the decryption method comprising:

obtaining of a trapdoor associated with each of the distinct elementary data of the data stream, said trapdoor being generated in accordance with the method for generating trapdoors such as described previously, detection of the presence of said trapdoor, in accordance with the method for detecting trapdoors such as described previously.

The decryption method consists in generating a trapdoor for each elementary data item which constitutes the stream. For example, if the stream is considered to be a string of bits, the constituent elementary data making up the stream comprise the values "0" and "1". If the stream is considered to be a string of bytes, the elementary data comprise all the integers between 0 and 255.

The invention also relates to a device for generating trapdoors in a searchable encryption system, said system defining a secret key and a public key, a trapdoor V being associated with a keyword W comprising l elementary data $w_1 \ldots w_l$, said entity comprising:

first generating means, designed to generate l randoms $v_1, v_2, \ldots, v_l$, second generating means, designed to generate a polynomial V in an element z, dependent on the secret key, and of degree l, a j-th coefficient of said polynomial, $1 \leq j \leq l$, being dependent on an encoding of the j-th elementary data item $w_j$ of the keyword defined in the secret key and a j-th random $v_j$ of the l-randoms, said trapdoor comprising said polynomial associated with a random element of a group h of a bilinear environment, and the l randoms associated with the random element of the group.

The invention also pertains to a program for an entity for generating trapdoors in a searchable encryption system, comprising program code instructions intended to control the execution of the steps of the method for generating trapdoors such as described previously, when the program is executed on said entity.

The invention also relates to a searchable encryption device of a system defining a secret key and a public key, a ciphertext C of a data stream B which comprises n elementary data $b_1, b_2, \ldots, b_n$, said entity comprising:
- first generating means, designed to generate a random a,
- second generating means, designed to generate, for any elementary data item $b_j$, j=1 to n, an element dependent on the public key $g^{x(b_j).z^j}$ and the random, said element being associated with a random element g of a group of a bilinear environment, said element associated with the random element of the group forming a first encryption data item $C_{j,1}$, and generation of a shift factor $g^{a.z^{j-1}}$ dependent on the random and the public key, and associated with the random element of the group, said shift factor being representative of a position of said monomial in the encrypted stream C, said shift factor associated with the random element of the group forming a second encryption data item $C_{j,2}$, said ciphertext C of the data stream comprising for any j=1 to n, the first and second encryption data items.

The invention also pertains to a program for a searchable encryption entity, comprising program code instructions intended to control the execution of the steps of the searchable encryption method such as described previously, when the program is executed on said entity.

The invention also relates to a device for detecting a keyword W in a ciphertext C of a data stream B in a searchable encryption system, said system defining a secret key and a public key, said keyword comprising l elementary data $w_1 \ldots w_l$, said entity comprising:
- obtaining means, designed to obtain a trapdoor T associated with the keyword, said trapdoor comprising l randoms $v_i$ associated with a random element h of a group of a bilinear environment, and a polynomial V in an element z, dependent on the secret key and of degree l, said polynomial being associated with the random element of the group $h^V$, an i-th coefficient of said polynomial, $1 \leq i \leq l$, being dependent on a ciphertext of the i-th elementary data item $w_i$ of the keyword defined in the secret key and an i-th random $v_i$ of the l randoms,
- coupling and assembling means, designed to, starting from a current position j, and for any i=1 to l, calculate a coupling of the (j+i)-th element of the ciphertext and of the i-th random of the trapdoor by means of a bilinear mapping e, said bilinear mapping taking as input a first random element g of a first group G1 and a second random element h of a second group G2 and with values in a third group GT, and to assemble the l couplings obtained, said assembling producing a first polynomial of degree l,
- coupling means, designed to, for any i=1 to l, calculate a coupling of the shift factor associated with the current position and of the polynomial V associated with the trapdoor, said coupling producing a second polynomial U of degree l,
- comparison means, designed to compare the first and second polynomials, equality of the two polynomials being representative of the presence of the keyword W in the stream starting from the current position j.

The invention also pertains to a program for an entity for detecting the presence of a keyword in a ciphertext, comprising program code instructions intended to control the execution of the steps of the method for detecting the presence of a keyword in a ciphertext such as described previously, when the program is executed on said entity.

Finally, the invention also relates to a searchable encryption system comprising:
- a device for generating trapdoors such as described previously,
- a searchable encryption device such as described previously, and
- a device for detecting the presence of a keyword in an encrypt such as described previously.

Other characteristics and advantages of the present invention will be better understood from the description and appended drawings among which:

FIGS. 1a and 1b present a searchable encryption system, according to two exemplary embodiments;

FIG. 2 presents the steps of a searchable encryption method, according to an exemplary embodiment;

FIG. 3 presents the steps of a method for generating trapdoors, according to an exemplary embodiment;

FIG. 4 presents the steps of a method for detecting a keyword in a stream, according to an exemplary embodiment;

FIG. 5 presents the steps of a decryption method, according to an exemplary embodiment;

Figure 1A:
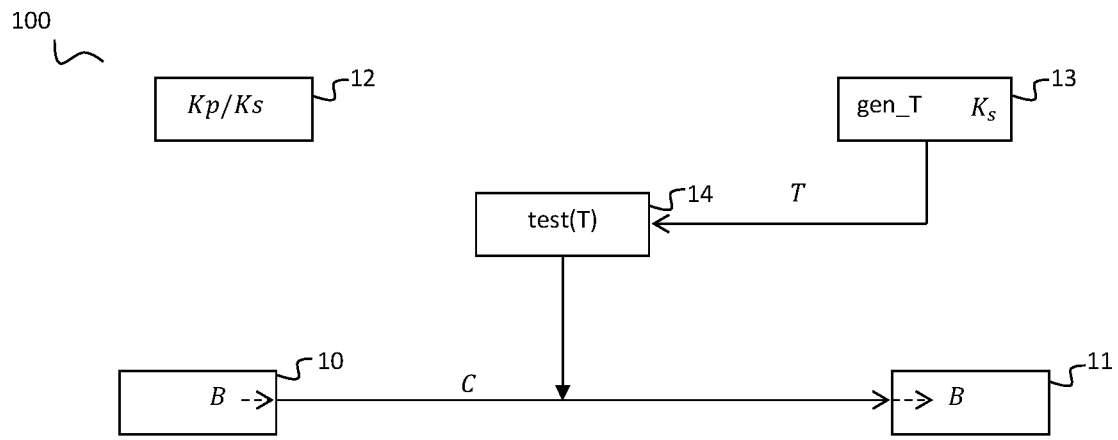

A searchable encryption system, according to a first exemplary embodiment, will now be described in conjunction with FIG. 1a.

A searchable encryption system 100 intended to detect the presence of an element, or keyword W, in an encrypted stream C comprises a plurality of entities. An encryption entity 10 is designed to encrypt a data stream B for the attention of a decryption entity 11. The data stream is for example a stream of bits, or a stream of bytes. The decryption entity 11 is designed to receive the stream B encrypted as a stream C, and to decrypt it.

The searchable encryption system 100 is based on a public-key cryptography system. To this end it rests upon a secret key $K_s$ and an associated public key $K_p$. It is assumed that an entity 12 for generating keys is designed to generate the pair of keys $K_s$, $K_p$ for the system 100 according to a known scheme.

An entity for generating trapdoors 13 is designed to generate, for a keyword W to be searched for in the encrypted stream B, an associated "trapdoor" T. A trapdoor T is a piece of information associated with the keyword W; the trapdoor T is designed to allow a test entity 14 which holds it to search for the presence of the keyword W in the encrypted stream C. The entity for generating trapdoors 13 has at its disposal the secret key $K_s$ generated by the entity for generating keys 12. The entity for generating trapdoors 13 is designed to transmit the trapdoor or trapdoors that it has generated to the test entity 14.

Figure 1B:
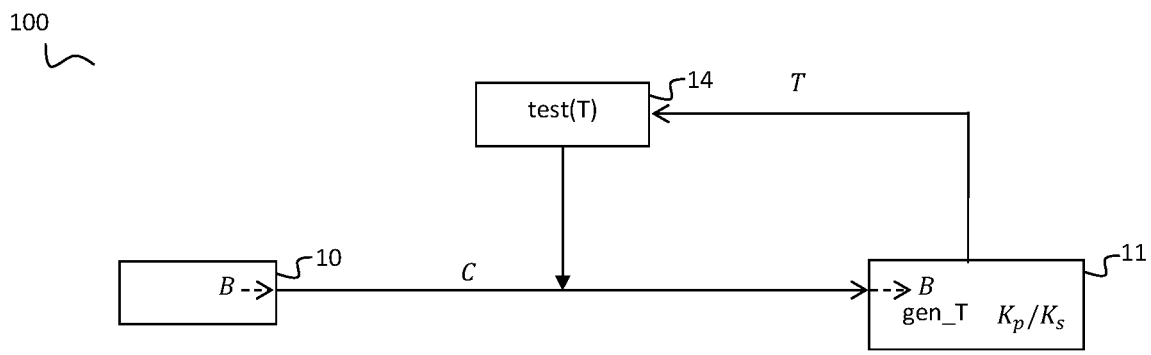

In a second exemplary embodiment of the encryption system 100, illustrated by FIG. 1b, the decryption entity 11 is designed to generate the keys, to generate the trapdoors associated with the keywords to be searched for and to transmit them to the test entity 14. Stated otherwise, the decryption entity 11 implements the functionalities of the entity for generating keys 12 and of the entity for generating trapdoors 13 such as are presented in conjunction with FIG. 1a. It is understood that the exemplary embodiment described in conjunction with FIG. 1b offers maximum security in the sense that the secret key $K_s$ of the system is held only by a single entity, the decryption entity 11.

In another variant (not represented) the entity for generating keys 12 is independent of the decryption entity 11. In this case, the decryption entity 11 receives the secret key $K_s$ from the entity for generating keys 12 in a secure manner, according to a known protocol.

In another exemplary embodiment (not represented), the decryption entity 11 implements the functions of the test entity 14 and detects the presence of keywords in a stream. Such an architecture is suitable for malware detection implemented by an enterprise on an incoming encrypted data stream.

The searchable encryption system 100 operates in a bilinear environment which refers to three cyclic groups, customarily denoted G1, G2 and GT, of prime order p, as well as a bilinear mapping e, called a "bilinear coupling" taking as input an element of the group G1 and an element of the group G2 and with values in the group GT.

This type of environment is frequently used in cryptography and may be implemented very efficiently.

An exemplary embodiment is concerned with an asymmetric bilinear environment which refers to the case where no efficiently evaluable functions between the groups G1 and G2 are known.

Figure 2:
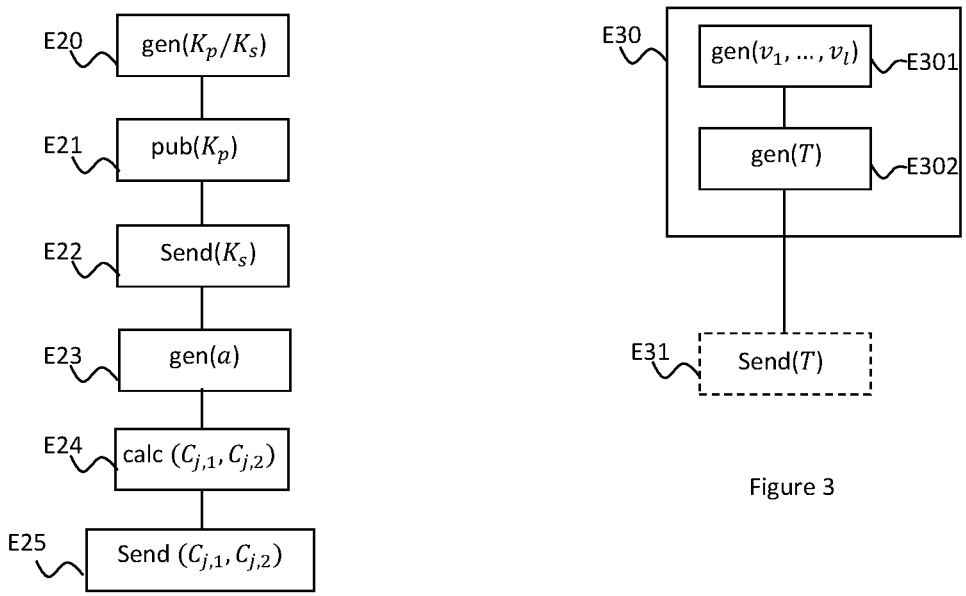

The steps of a searchable encryption method, according to an exemplary embodiment, will now be described in conjunction with FIG. 2.

The method described here is illustrated in the case of a searchable encryption system 100 such as represented in conjunction with FIG. 1a. In this example, it is considered that the entity for generating keys 12 of the system 100 is distinct from the decryption entity 11. Likewise, it is considered that the entity for generating trapdoors 14 is distinct from the decryption entity 11. Although non-optimum as regards security, this system makes it possible to distinguish the functions of each of the entities. Adaptation of the method to another system, for example the system 100 described in conjunction with FIG. 1b, is immediate.

The encryption entity 10 is designed to encrypt a data stream B for the attention of the decryption entity 11. The data stream B is for example a stream of bits, or a stream of bytes. In the example described here it is assumed that the data stream which is encrypted is a stream of n-bits, denoted $B=b_1 \ldots b_n$. The decryption entity 11 is designed to receive the encrypted stream, denoted C, and to decrypt it.

In a prior step E20 of generating keys, the entity for generating keys 12 generates a secret/public key pair $K_s/K_p$ for the searchable encryption system 100. The secret key $K_s$ of the system 100 comprises a secret, such as a random integer z, and an encoding of each of the possible values taken by the elements $b_i$, or elementary data. For example, with each possible value of $b_i$ is associated a random integer $x_i$. The encoding of the value $b_i$ is the integer $x_i$ and is denoted $x(b_i)=x_i$. Note that in the case of streams of bits, the secret key $K_s$ comprises two encoding values associated respectively with the bits 0 and 1. Thus, the secret key of the system 100 comprises, for all possible values of $b_i$:

$$K_s = \begin{cases} x_i = x(b_i), \\ z \end{cases}$$

The associated public key comprises:

$$K_p = \begin{cases} g^{z^j} \\ g^{(x_i \cdot z^j)} \end{cases}$$

with g a random element of the group G1, and j the maximum size of the data streams to be encrypted. For example, j=1000, or j=256, etc. In a conventional manner, exponentiation makes it possible not to be able to retrieve the values $z^j$ and $x_i \cdot z^j$ from the public key.

Note that in another exemplary embodiment where the stream would consist of bytes, the secret key would comprise a random integer and the encoding of 256 values.

In a following publication step E21, the public key $K_p$ is published by the key generating entity 12. The secret key $K_s$ is transmitted in a secure manner to the decryption entity 11 in a sending step E22. Note that the prior steps of generating keys E20, of publication E21 and of sending the secret key E22 are executed on creation of the system, for the generation of a pair of keys. The public key $K_p$ is used for any encryption and by any encryption entity 10 for the attention of the decryption entity 11, until the pair of keys is revoked or/and renewed.

In a following step E23 for generating a random, the encryption entity 10 randomly generates an integer a.

In a following encryption step E24, the encryption entity 10 undertakes the encryption of the data item B by means of the elements of the public key $K_p$. To this end, the encryption entity 10 calculates for each element $b_j, 1 \leq j \leq n$ of the stream $B=b_1 \ldots b_n$ to be encrypted a first encryption data item $C_{j,1}$ and a second encryption data item $C_{j,2}$ according to the following formula:

$$\begin{cases} C_{j,1} = \left(g^{x(b_j) z^j}\right)^a \\ C_{j,2} = \left(g^{z^{j-1}}\right)^a \end{cases}$$

The power of the first encryption data item $C_{j,1}=(g^{x(b_j) \cdot z^j})^a$ is a monomial associated with the j-th element of the stream B.

The second encryption data item, $C_{j,2}=(g^{z^{j-1}})^a$, is intended to take account of the position j of the current bit $b_j$ in the stream B to be encrypted and thus to take into account a shift of the current bit $b_j$ with respect to the initial bit $b_1$ in the stream B. Thus, and according to this formula, for the bit $b_1$ of B, positioned in first position, there is no shift, the associated shift element is $g^a$. The bit $b_2$ positioned in second position undergoes a shift of 1 with respect to the first bit $b_1$, the associated shift element is then $(g^z)^a$, etc. The first and second encryption data items $C_{j,1}$, $C_{j,2}$ form an encrypted stream C corresponding to the ciphertext of the stream B.

In a following sending step 25, the encryption entity 10 sends the encrypted stream C to the decryption entity 11.

The generation of the first and second encryption data items is carried out independently of keywords to be searched for in the stream B. Thus, it is not necessary to define a priori the keywords while encrypting a stream, as is the case with known solutions. Thus, the searchable encryption described here offers significant flexibility which allows application to encrypted stream broadcasting services in which the keywords that the entity which decrypts wants to identify in the stream are defined by said entity itself, without involving the encryption entity.

Figure 3:
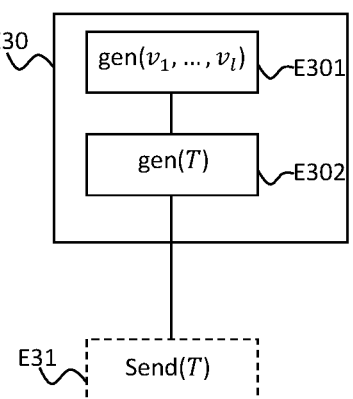

A method for generating trapdoors, according to an exemplary embodiment, will now be described in conjunction with FIG. 3.

The method for generating trapdoors is implemented by the entity for generating trapdoors 13. Note that the method for generating trapdoors is independent of the encryption method and can be implemented provided that the entity 13 for generating trapdoors possesses the secret key $K_s$. and the data item that it is searching for.

In an initial step E30 of generating a trapdoor, the entity 13 for generating trapdoors, holding the secret key $K_s$, generates a trapdoor T for a keyword W. The keyword W is a plaintext data item, here a string of bits. The trapdoor T which is associated therewith is intended to be used to search for the presence of the keyword W in the stream B, on the basis of the encrypted stream C. The keyword W is a series of bits: $W=w_1 \ldots w_l$. The generation of the trapdoor T associated with the keyword W consists in generating in a first generating sub-step E301, l random integers $v_i$, $1 \leq i \leq l$, and in generating in a second generating sub-step E302 a polynomial V in z of degree l whose coefficients are of the form:

$v_i \cdot x(w_i)$, where $x(w_i)$ is the encoding of $w_i$ such as defined in the course of the step of configuration by the secret key $K_s$.

The random values and the polynomial V not being able to be revealed, they are transmitted to the test entity 14 in the guise of trapdoor T in the form of an exponentiation. More precisely, the trapdoor T associated with the keyword W and which comprises the l random values and the polynomial V in z of degree l comprises:

$$T = \begin{cases} h^V = h^{v_1 \cdot x(w_1) \cdot z + v_2 \cdot x(w_2) \cdot z^2 + \ldots + v_l \cdot x(w_l) \cdot z^l}, \\ h^{v_1}, h^{v_2}, \ldots, h^{v_l} \end{cases},$$

where h is a random element of the group G2.

In a following sending step E31, the trapdoor T associated with the keyword W is sent to the test entity 14, designed to detect the presence of the keyword W with which the trapdoor T in the stream B has been associated therewith on the basis of the encrypted stream C. Note that in an exemplary embodiment where the decryption entity 11 implements the functions of the entity for generating trapdoors 13 and of the test entity 14, this step is not executed. It appears dashed in FIG. 3.

The method for generating trapdoors does not impose any constraint as regards the size of the keywords with which the trapdoors are associated and/or as regards their number. With respect to known solutions, this offers great flexibility as regards the choice of keywords.

In a variant embodiment of the method for generating trapdoors, there are selected in the course of the generating sub-step E301, l random elements $v_i$, $1 \leq i \leq l$, of a subset of integers. In this example, there is no constraint as regards the size of the subset from which the random elements arise. Thus, it is possible for some of the elements $v_i$ generated in this subset to be equal. This is the case for example when the subset is reduced to an element. By selecting the random elements in a subset of integers, the phase of detecting trapdoors in the ciphertext is optimized; the detection time can be considerably reduced, especially when several random elements are equal.

Figure 4:
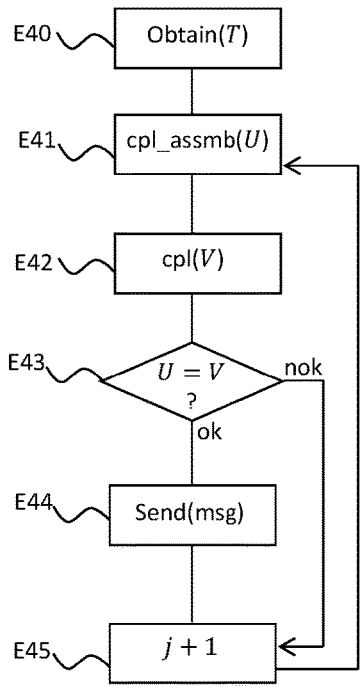

A method for detecting a keyword in an encrypted stream, according to an exemplary embodiment, will now be described in conjunction with FIG. 4.

The detection method, implemented by the test entity 14, consists in searching for the presence of the keyword W in the stream B on the basis of the encrypted stream C. Indeed, it is the encrypted stream C which is transmitted between the encryption entity 10 and the decryption entity 11 and it is this encrypted stream C that the test entity 14 analyses with the aim of detecting the presence of the keyword W. More precisely, it is question of verifying whether a sub-string of the stream B, $b_{j+1} \ldots b_{j+l}$ transmitted encrypted in the stream C is equal to the keyword W. An informal objective is to reconstruct a polynomial U on the basis of the first encryption data $C_{j+1,1}, \ldots, C_{j+l,1}$ of the stream B and to compare it with the polynomial V which is associated with the trapdoor T. Indeed, a mathematical property of polynomials is that two polynomials are equal if and only if their coefficients are pairwise equal. Since the encoding used to encrypt the stream B, more precisely the elementary data $b_1 \ldots b_n$ of the stream B, and the encoding used to construct the trapdoor T, which depends on the encoding of the elementary data $w_1 \ldots w_l$ of the keyword W, is the same, then equality of the two polynomials necessarily implies that the successive encodings of the elementary data $b_{j+1} \ldots b_{j+l}$ which feature in the polynomial U are equal to the encodings of the elementary data $w_1 \ldots w_l$ of the keyword W which are used to generate the trapdoor T. Such equality therefore indicates that the keyword $W=w_1 \ldots w_l$ is equal to the sub-string $b_{j+1} \ldots b_{j+l}$ of the stream B.

In an initial obtaining step E40, the test entity 14 obtains the trapdoor T associated with the keyword W. In the example described here, the test entity 14 receives from the entity for generating trapdoors 13 the trapdoor T associated with the keyword W. In another exemplary embodiment in which the decryption entity 11 implements the functions of the entity 13 for generating trapdoors and the functions of the test entity 14, the decryption entity 11 obtains the trapdoor T by generating it. In a following step E41 of coupling and assembling elements of the ciphertext from a current position, the test entity 14 assembles l-elements of the ciphertext from a current position j with the aim of obtaining a polynomial U. This polynomial is intended to be compared with the polynomial V associated with the trapdoor T. The first encryption data being exponentiations of monomials, there is calculated the product of the exponentiations of the consecutive l-monomials. Moreover, it is noted that random integers $v_i$ occur in the coefficients of the polynomial V associated with the trapdoor T. In order for the comparison between the polynomials U and V to be meaningful it is therefore necessary that the integers $v_i$ also occur in the polynomial U to be reconstructed. To this effect, in the coupling and assembling step E41, a coupling is used between the first encryption data $C_{j+1,1}$ and the parameters $h^{v_i}$, included in the trapdoor T and one therefore calculates:

$$\prod_{i=1 \text{à} l} e(C_{j+i,1}, h^{v_i}), \text{ where}$$

$\prod$ is the standard symbol for designating a product =

$$e(C_{j+1,1}, h^{v_1}) \cdot e(C_{j+2,1}, h^{v_2}) \ldots e(C_{j+l,1}, h^{v_l}) =$$

$$e\left(\left(g^{x(b_{j+1}) \cdot z^{j+1}}\right)^a, h^{v_1}\right) \cdot e\left(\left(g^{x(b_{j+2}) \cdot z^{j+2}}\right)^a, h^{v_2}\right) \ldots e\left(\left(g^{x(b_{j+l}) \cdot z^{j+l}}\right)^a, h^{v_l}\right) =$$

$$e(g, h)^{a \cdot x(b_{j+1}) \cdot z^{j+1} \cdot v_1} \cdot e(g, h)^{a \cdot x(b_{j+2}) \cdot z^{j+2} \cdot v_2} \ldots e(g, h)^{a \cdot x(b_{j+l}) \cdot z^{j+l} \cdot v_l}$$

By using the properties of the coupling and post-product, the exponent of e(g, h) is a polynomial U' such that:

$$U' = a \cdot \sum_{i=1 \hat{a} l} x(b_{j+1}) \cdot v_i \cdot z^{j+i}$$

$$U' = a \cdot z^j \cdot \sum_{i=1 \hat{a} l} x(b_{j+1}) \cdot v_i \cdot z^i$$

$$U' = a \cdot z^j \cdot U$$

where U is a polynomial in z of degree l.

It is noted that equality between the sub-string $b_{j+1} \ldots b_{j+1}$ and the keyword W is equivalent to equality between the polynomial U and the polynomial V since the encodings involved in encrypting the stream B and in generating the trapdoor T associated with the keyword W are the same.

To compare the sub-string $b_{j+1} \ldots b_{j+l}$ and the keyword W, it therefore remains to compare the polynomials U and V, this being possible by virtue of the coupling. Thus, in a coupling step E42, there is calculated the coupling of the second encryption data item $C_{j+1,2}$ and of the first element of the trapdoor $T, h^V$. One obtains:

$$e(C_{j+1,2}, h^V) = e(g^{a \cdot z(j+1-1)}, h^V) = e(g, h)^{a \cdot zj \cdot V}$$

The second encryption data item $C_{j+1,2}$ is used to shift the polynomial V, or more precisely to take account of the current position j, in the stream B, starting from which the search for the keyword W is performed. The current position j constitutes the shift that has to be taken into account. Note that the second encryption data item of index j+1 is used since by construction this is the data item which corresponds to the monomial which features in the current position.

In a following test step E43, one verifies whether:

$$e(g,h)^{a \cdot z^j \cdot U} = e(g,h)^{a \cdot z^j \cdot V}$$

In a first case ("ok" branch in FIG. 4) where the equality is satisfied, corresponding to the case where U=V, then this signifies that the sub-string $b_{1+1} \ldots b_{j+l}$ is identical to the keyword W. Indeed, U has the property that if U=V then $b_{j+1} \ldots b_{j+l}$=W. In an exemplary embodiment, in a following message sending step E44, an information message is sent to the decryption entity 11 so as to inform it of the presence of the keyword in the stream and of the position j+1 in the stream B at which the keyword has been found. In a following incrementing step E45, the current position j is incremented by one notch and the search for the keyword W continues from this new current position.

In a second case ("nok" branch in FIG. 4) where the equality is not satisfied, the keyword W is different from $b_{j+1} \ldots b_{j+l}$ since there exists at least one difference between the polynomials U and V. In an exemplary embodiment, in the following incrementing step E45, the current position j is incremented by one notch and the search for the keyword W continues from this new current position.

The method makes it possible to detect the presence of keywords of any size, in any encrypted stream and at any location in this string. The detection of a keyword in a stream makes it possible not only to be informed of the presence of the keyword in the string but also to know the keyword's exact location in the stream.

Figure 5:
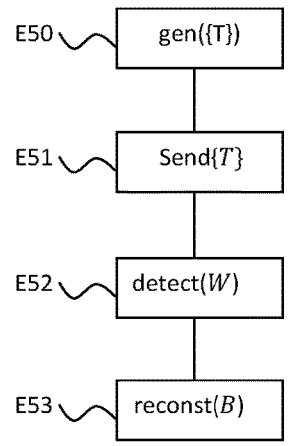

A decryption method, according to an exemplary embodiment, will now be described in conjunction with FIG. 5.

In an initial step E50 of generating trapdoors, the entity for generating trapdoors 13 generates trapdoors for all the possible values of elementary data of a stream B. In the example described here of a stream of bits, two trapdoors are generated: one for a first keyword corresponding to the bit 0 and one for a second keyword corresponding to the bit 1. Note that in the case of a stream of bits, the generation of a single trapdoor, associated with one of the two keywords, is sufficient.

In a following step E51 of sending the trapdoors, the entity for generating trapdoors 13 sends the previously generated trapdoors to the test entity 14.

In a following test step E52, implemented when sending an encrypted stream C from the encryption entity 10 to the decryption entity 11, the test entity 14 implements the method for detecting a keyword such as described previously for the set of trapdoors that it has received previously. Thus, in accordance with an exemplary embodiment described, the decryption entity 11 is informed of the detection of each of the keywords, that is to say of each of the bits and of their position.

In a following reconstructing step E53, the decryption entity 11 which knows the position of each of the keywords, in this instance the bits 0 and 1, reconstructs the plaintext stream. Note that in the case where a single trapdoor has been generated, for example for the keyword corresponding to the bit 0, the decryption entity 11 which receives from the test entity 14 the position of all the bits 0 in the stream B, sets the other bits of the stream to 1 and thus reconstructs the initial stream B.

Figure 6:
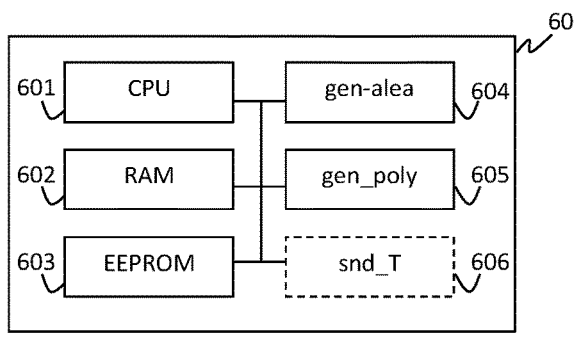
FIG. 6 is a schematic representation of a device for generating trapdoors, according to an exemplary embodiment.

A device for generating trapdoors in a searchable encryption system, according to an exemplary embodiment will now be described in conjunction with FIG. 6.

A device 60 for generating trapdoors is an item of computing equipment, such as a computer.

The device 60 for generating trapdoors comprises:

a processing unit or processor 601, or "CPU" ("Central Processing Unit"), intended to load instructions into memory, to execute them and to perform operations;

a set of memories, including a volatile memory 602, or "RAM" (for "Random Access Memory") used to execute code instructions, to store variables, etc., and a storage memory 603 of "EEPROM" type ("Electrically Erasable Programmable Read Only Memory"). In particular, the storage memory 603 is designed to store a software module for generating trapdoors which comprises code instructions for implementing the steps of the method for generating trapdoors such as is described previously. The storage memory 603 is also designed to store in a secure area the secret key $K_s$ of the searchable encryption system.

The device 60 for generating trapdoors also comprises:

a first generating module 604, designed to generate, for a trapdoor T associated with a keyword W which comprises l elementary data, $W = w_1 \ldots w_l$, l randoms $v_1, v_2, \ldots, v_l$. The first generating module 604 is designed to implement step E301 of the trapdoor generating method such as described previously;

a second generating module 605, designed to generate a polynomial V in an element z, dependent on the secret key, and of degree l in which a j-th coefficient of said polynomial, $1 \leq j \leq l$, is dependent on an encoding of the j-th elementary data item $w_j$ of the keyword defined in the secret key $K_s$ of the searchable encryption system and of a j-th random $v_j$ of the l randoms. The second generating module 605 is designed to implement step E302 of the method for generating trapdoors such as described previously;

an optional sending module 606, designed to send the trapdoor T which comprises said polynomial $h^V$ associated with a random element h of a group of a bilinear environment, and the l randoms $h^{v_j}$ associated with the random element of the group. The sending module 606 is designed to implement the optional step E31 of the method for generating trapdoors such as described previously. The sending module 606 appears dashed in FIG. 6.

The first and second generating modules 604 and 605, and the sending module 606 are preferably software modules comprising software instructions for implementing the steps of the method for generating trapdoors of a searchable encryption system such as described previously.

The invention therefore also relates to:
- a computer program comprising instructions for the implementation of the method for generating trapdoors such as described previously when this program is executed by a processor of the device for generating trapdoors,
- a readable recording medium on which is recorded the computer program described hereinabove.

Figure 7:
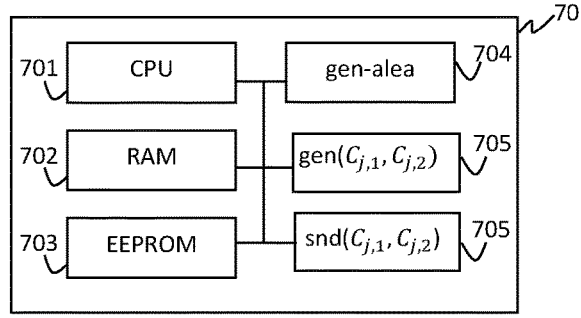
FIG. 7 is a schematic representation of a searchable encryption device, according to an exemplary embodiment.

A searchable encryption device, according to an exemplary embodiment, will now be described in conjunction with FIG. 7.

A searchable encryption device 70 is an item of computing equipment, such as a computer.

The searchable encryption device 70 comprises:
- a processing unit or processor 701, or CPU, intended to load instructions into memory, to execute them and to perform operations;
- a set of memories, including a volatile memory 702, or RAM used to execute code instructions, to store variables, etc., and a storage memory 703 of EEPROM type. In particular, the storage memory 703 is designed to store a searchable encryption software module which comprises code instructions for implementing the steps of the searchable encryption method such as is described previously. The memory 703 is also designed to store the public key $K_p$ of the searchable encryption system;

The searchable encryption device 70 also comprises:
- a first generating module 704, designed to generate a random a. The first generating module 704 is designed to implement step E23 of the searchable encryption method such as described previously;
- a second generating module 705, designed to generate, for any elementary data item $b_j$, j=1 to n, of the stream B to be encrypted, the power of a monomial dependent on the public key $(g^{x(b_j) \cdot z^i})$ and the random, said element being associated with a random element of a group g of a bilinear environment, said element associated with the random element of the group forming a first encryption data item $(C_{j,1})$. The second generating module 705 is also designed to generate a shift factor $g^{a \cdot z^{j-1}}$, dependent on the random and the public key, and associated with the random element of the group, said shift factor being representative of a position of said monomial in the encrypted stream C, said shift factor associated with the random element of the group forming a second encryption data item $(C_{j,2})$. The ciphertext C of the data stream comprises, for any j=1 to n, the monomials generated and the associated shift factors. Stated otherwise, the ciphertext comprises the first and second encryption data items $C_{j,1}$, $C_{j,2}$. The second generating module 705 is designed to implement step E24 of the searchable encryption method such as described previously.

The first and second generating modules 704 and 705 are preferably software modules comprising software instructions for implementing the steps of the searchable encryption method such as is described previously.

The invention therefore also relates to:
- a computer program comprising instructions for the implementation of the searchable encryption method such as described previously when this program is executed by a processor of the searchable encryption device,
- a readable recording medium on which is recorded the computer program described hereinabove.

Figure 8:
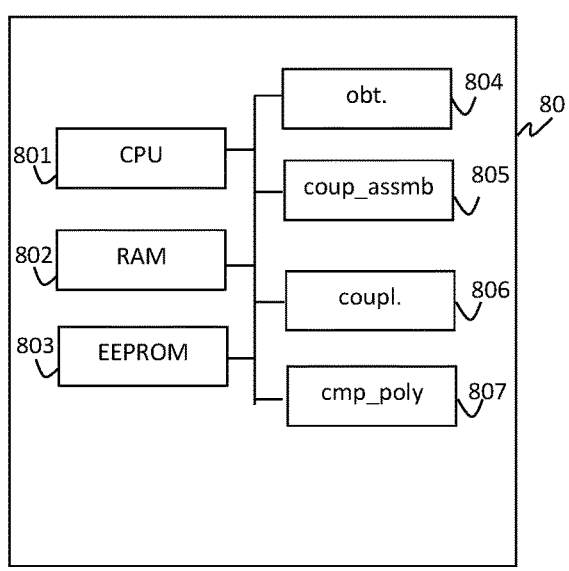
FIG. 8 is a schematic representation of a device for detecting the presence of a keyword in a stream, according to an exemplary embodiment.

A device for detecting a keyword in a stream, according to an exemplary embodiment, will now be described in conjunction with FIG. 8.

A device 80 for detecting a keyword in a stream is an item of computing equipment, such as a computer.

The device 80 for detecting a keyword in a stream comprises:
- a processing unit or processor 801, or CPU, intended to load instructions into memory, to execute them and to perform operations;
- a set of memories, including a volatile memory 802, or RAM used to execute code instructions, to store variables, etc., and a storage memory 803 of EEPROM type. In particular, the storage memory 803 is designed to store a software module for detecting a keyword in a stream which comprises code instructions for implementing the steps of the searchable encryption method such as is described previously;

The device 80 for detecting a keyword in a stream also comprises:
- an obtaining module 804, designed to obtain a trapdoor T associated with the keyword, said trapdoor comprising l randoms $h^{v_i}$ associated with a random element h of a group of a bilinear environment, and a polynomial V in an element z, dependent on the secret key and of degree l, said polynomial being associated with the random element of the group $h^V$, an i-th coefficient of said polynomial, 1≤i≤l, being dependent on an encoding of the i-th elementary data item $w_i$ of the keyword defined in the secret key and an i-th random $v_i$ of the l randoms. In an exemplary embodiment where the device 80 for detecting a keyword is distinct from the entity for generating trapdoors 13, the obtaining module 804 receives the trapdoor T from the device 13 for generating trapdoors. The obtaining module 804 is designed to implement step E40 of the method for detecting a keyword such as described previously;
- a coupling and assembling module 805, designed to, starting from a current position j, and for any i=1 to l, calculate a coupling of the (j+i)-th element of the encrypt and of the i-th random of the trapdoor by means of a bilinear mapping (e), said bilinear mapping taking as input a first element g of a first group G1 and a second element h of a second group G2 and with values in a third group GT, and assembling the l couplings obtained, said assembling producing a first polynomial of degree l. The coupling and assembling module 805 is designed to implement step E41 of the method for detecting a keyword such as described previously;
- a coupling module 806, designed to, for any i=1 to l, calculate a coupling of the shift factor associated with the current position and of the polynomial V associated with the trapdoor, said coupling producing a second polynomial U of degree l. The coupling module 806 is designed to implement step E42 of the method for detecting a keyword such as described previously;

a module 807 for comparing the first and second polynomials, designed to compare the first and second polynomials, equality of the two polynomials being representative of the presence of the keyword W in the stream B starting from the current position j. The comparing module 807 is designed to implement step E43 of the method for detecting a keyword such as described previously.

The obtaining module 804, the coupling and assembling module 805, the coupling module 806 and the comparing module 807 are preferably software modules comprising software instructions for implementing the steps of the method for detecting a keyword in a stream such as is described previously.

The invention therefore also relates to:

a computer program comprising instructions for the implementation of the method for detecting a keyword in a stream such as described previously when this program is executed by a processor of the device for detection a keyword in a stream, a readable recording medium on which is recorded the computer program described hereinabove.

The invention also pertains to a searchable encryption system 100 which comprises:

a device for generating trapdoors 60, such as described previously, at least one searchable encryption device 70, such as described previously, and a device 80 for detecting a keyword in a stream such as described previously.

Note that in an exemplary embodiment where the devices for generating trapdoors 60, and for detecting a keyword in a stream 80 are distinct, the trapdoor sending module 606 of the device for generating trapdoors 60 is present in the system.

The invention claimed is:

1. A method of generating trapdoors in a searchable encryption system, the system defining a secret key and a public key, a trapdoor being associated with a keyword comprising elementary data $(v_1, v_2, \ldots w_l)$ the trapdoor being generated by:

generating l randoms $(v_1, v_2, \ldots v_l)$, generating a polynomial (V) in an element z, the polynomial dependent on the secret key, the polynomial of degree l, a j-th coefficient of the polynomial, $1 \leq j \leq l$, being dependent on an encoding of the j-th elementary data item $(w_j)$ of the keyword defined in the secret key and of a j-th random $(v_j)$ of the l randoms, the trapdoor comprising the polynomial associated with a random element of a group (h) of a bilinear environment, and the l randoms associated with the random element of the group; and making the trapdoor available to a test entity configured to detect the keyword in a ciphertext of a data stream transmitted between an encryption entity and a decryption entity.

2. A searchable encryption method of a system defining a secret key and a public key, a ciphertext of a data stream which comprises n elementary data $(b_1, b_2, \ldots b_n)$ comprising:

generation of a random (a), and for any elementary data item $b_j$, j=1 to n, generation of an element dependent on the public key $(g^{x(b)}_j, z^j)$ and the random, the element being associated with a random element of a group (g) of a bilinear environment, the element associated with the random element of the group forming a first encryption data item $(C_{j,1})$, and generation of a shift factor $(g^{a z^{j-z}})$ dependent on the random and the public key, and associated with the random element of the group, the shift factor being representative of a position of a monomial in the encrypted stream, the shift factor associated with the random element of the group forming a second encryption data item $(C_{j,2})$, the ciphertext of the data stream comprising for any j=1 to n, the first and second encryption data items;

the method further comprising transmission of the ciphertext of the data stream to a decryption entity configured to decrypt the ciphertext of the data stream.

3. A method of detecting a keyword in a ciphertext of a data stream in a searchable encryption system, the system defining a secret key and a public key, the keyword comprising l elementary data $(w_1, \ldots w_l)$, the method comprising:

obtaining a trapdoor associated with the keyword, the trapdoor comprising l randoms $(h^{v_i})$ associated with a random element (h) of a group of a bilinear environment, and a polynomial in an element z, dependent on the secret key and of degree l, the polynomial being associated with the random element of the group $(h^v)$, an i-th coefficient of the polynomial, $1 \leq i \leq l$, being dependent on an encoding of the i-th elementary data item $(w_i)$ of the keyword defined in the secret key and an i-th random $(v_i)$ of the l randoms, starting from a current position j, and for any i=1 to l, coupling (E41) of the (j+i)-th element of the ciphertext and of the i-th random of the trapdoor by means of a bilinear mapping, the bilinear mapping taking as input a first element of a first group and a second element of a second group and with values in a third group, and assembling the l couplings obtained, the assembling producing a first polynomial of degree l, for any i=1 to l, coupling a shift factor associated with the current position and of the polynomial associated with the trapdoor, the coupling producing a second polynomial of degree l, and comparing the first and second polynomials, equality of the two polynomials being representative of the presence of the keyword in the stream starting from the current position j.

4. A method of decrypting a ciphertext of a data stream, the data stream comprising of elementary data $(b_1, b_2, \ldots b_n)$, the ciphertext being generated in by the searchable encryption method of claim 2, the decryption method comprising:

obtaining (E50) of a trapdoor associated with each of the distinct elementary data of the data stream, the trapdoor being generated in accordance with the method for generating trapdoors as claimed in claim 1, detecting the presence of the trapdoor, in accordance with the method of claim 3.

5. A device for generating trapdoors in a searchable encryption system, the system defining a secret key and a public key, a trapdoor being associated with a keyword comprising l a elementary data $(w_1 \ldots w_l)$, the device configured to:

generate l randoms $(v_1, v_2, \ldots v_l)$, generate a polynomial in an element z, dependent on the secret key, and of degree l a j-th coefficient of the polynomial, $1 \leq j \leq l$, being dependent on an encoding of the j-th elementary data item $(w_j)$ of the keyword defined in the secret key and a J-th random $(v_j)$ of the l-randoms, the trapdoor comprising the polynomial associated with a random element of a group (h) of a bilinear environment, and the l randoms associated with the random element of the group; and make the trapdoor available to a test entity configured to detect the keyword in a ciphertext of a data stream transmitted between an encryption entity and a decryption entity.

6. A non-transitory computer readable medium having stored thereon instructions which, when executed by a processor, cause the processor to implement the method of claim 1.

7. A searchable encryption device of a system defining a secret key and a public key, a ciphertext of a data stream which comprises n elementary data $(b_1, b_2, \ldots b_n)$, the device configured to:

generate a random (a), and generate, for any elementary data item $b_j$, $l=1$ to n, an element dependent on the public key $(g^{x(b}{}_j), z^i)$ and the random, the element being associated with a random element of a group (g) of a bilinear environment, the element associated with the random element of the group forming a first encryption data item $(C_{j,1})$ and generation of a shift factor $(g^{a.z^{j-1}})$ dependent on the random and the public key, and associated with the random element of the group, the shift factor being representative of a position of a monomial in the encrypted stream, the shift factor associated with the random element of the group forming a second encryption data item $(C_{j,2})$, the ciphertext of the data stream comprising for any j=1 to n, the first and second encryption data items;

the device further configured to transmit the ciphertext of the data stream to a decryption entity configured to decrypt the ciphertext of the data stream.

8. A non-transitory, computer readable medium having stored thereon instructions which, when executed by a processor, cause the processor to implement the method of claim 2.

9. A device for detecting a keyword in a ciphertext of a data stream in a searchable encryption system, the system defining a secret key and a public key, the keyword comprising l elementary data $(w_1 \ldots w_l)$, the device configured to:

obtain a trapdoor associated with the keyword, the trapdoor comprising l randoms $(h^{v_i})$ associated with a random element (h) of a group of a bilinear environment, and a polynomial in an element z, dependent on the secret key and of degree l, the polynomial being associated with the random element of the group $(h^v)$, an i-th coefficient of the polynomial, $1 \leq i \leq l$, being dependent on a ciphertext of the i-th elementary data item $(w_i)$ of the keyword defined in the secret key and an i-th random $(v_i)$ of the l randoms, starting from a current position j, and for any i=1 to l calculate a coupling of the (j+i)-th element of the ciphertext and of the i-th random of the trapdoor by means of a bilinear mapping, the bilinear mapping taking as input a first random element of a first group and a second random element of a second group and with values in a third group, and to assemble the l couplings obtained, the assembling producing a first polynomial of degree l, for any i=to 1to l, calculate a coupling of a shift factor associated with the current position and of the polynomial associated with the trapdoor, the coupling producing a second polynomial of degree l, compare the first and second polynomials, equality of the two polynomials being representative of the presence of the keyword in the stream starting from the current position j.

10. A non-transitory, computer readable medium having stored thereon instructions which, when executed by a processor, cause the processor to perform the method of claim 3.

11. A searchable encryption system comprising:

a trapdoor-generating device for generating trapdoors in the searchable encryption system, the system defining a secret key and a public key, a trapdoor being associated with a keyword comprising l elementary data $(w_1 \ldots w_l)$, the trapdoor-generating device configured to:

generate l randoms $(v_1, v_2, \ldots v_l)$, generate a polynomial in an element z, dependent on the secret key, and of degree l, a j-th coefficient of the polynomial, $1 \leq j \leq l$, being dependent on an encoding of the j-th elementary data item $(w_j)$ of the keyword defined in the secret key and a j-th random $(v_j)$ of the l-randoms, the trapdoor comprising the polynomial associated with a random element of a group (h) of a bilinear environment, and the l randoms associated with the random element of the group; and make the trapdoor available to a test entity configured to detect the keyword in a ciphertext of a data stream transmitted between an encryption entity and a decryption entity;

a searchable encryption device of the searchable encryption system, a ciphertext of a data stream which comprises n elementary data $(b_1, b_2, \ldots, b_n)$, the searchable encryption device configured to:

generate a random (a), and generate, for any elementary data item $b_j$, j=1 to n, an element dependent on the public key $(g^{x(b}{}_j), z^i)$ and the random, the element being associated with a random element of a group (g) of a bilinear environment, the element associated with the random element of the group forming a first encryption data item $(C_{j,1})$, and generation of a shift factor $(g^{a.z^{j-1}})$ dependent on the random and the public key, and associated with the random element of the group, the shift factor being representative of a position of a monomial in the encrypted stream, the shift factor associated with the random element of the group forming a second encryption data item $(C_{j,2})$, the ciphertext of the data stream comprising for any j=1 to n, the first and second encryption data items;

the device further configured to transmit the ciphertext of the data stream to a decryption entity configured to decrypt the ciphertext of the data stream; and the device of claim 9.

12. The method of claim 1, wherein making the trapdoor available to a test entity for use in the detection of the keyword in an encrypted stream comprises transmitting the trapdoor to a test entity distinct from an entity which generated the trapdoor.

13. The method of claim 1, wherein the test entity comprises the same entity that generated the trapdoor.

14. The method of claim 1, wherein the ciphertext in which the test entity is configured to detect the keyword is generated independently of the keyword the test entity is configured to detect.

15. The device of claim 5, wherein the device is configured to make the trapdoor available to a test entity for use in the detection of the keyword in an encrypted stream by transmitting the trapdoor to a test entity distinct from an entity which generated the trapdoor.

16. The device of claim 5, wherein the test entity comprises the same entity that generated the trapdoor.

17. The device of claim 5, wherein the ciphertext in which the test entity is configured to detect the keyword is generated independently of the keyword the test entity is configured to detect.

* * * * *